United States Patent Office 3,226,286
Patented Dec. 28, 1965

3,226,286
DEHYDRATED MICA PRODUCTS AND METHOD
OF MAKING SAME
Edward W. Scheuer, Chicago, Ill., assignor to The Budd
Company, a corporation of Pennsylvania
No Drawing. Filed Nov. 7, 1961, Ser. No. 150,667
7 Claims. (Cl. 161—171)

This invention relates to built-up, laminated or composite mica products, for example, mica tape, mica plate and various articles, formed from mica plate, and more particularly to such built-up or composite mica products formed of highly flexible, substantially non-resilient, dehydrated mica splitings having a laminar structure with capillaries substantially uniformly distributed between adjacent laminae. This invention also contemuplates a novel method for making such composite meica products.

The term mica or "the micas" defines a group of hydrated alumino silicate minerals which have a high dielectric strength and which possess a characteristic analogous crystallographic laminar structure. This structure (as found in nature, before dehydration) is somewhat flexible, highly resilient and transparent and has a high degree of cleavability (i.e., the laminar structure can be divided and sub-divided into extremely thin splittings).

Physically, mica is composed of layers of aluminum hydroxide and/or magnesium hydroxide sandwiched between two silica layers, this sequence being repeated indefinitely to form natural block mica.

The chemical composition of muscovite mica may be generally represented as $[Al_2](AlSi_3)O_{10}(OH,F)_2K$. Aluminum, $[Al_2]$, is replaced by magnesium in phlogopite mica, which has the general formula $$[Mg_3](AlSi_3)O_{10}(OH,F)_2K$$

and by lithium, titanium and ferric and ferrous iron in other micas. Muscovite and phlogopite mica have the following approximate analyses:

TABLE I

| Constituent | Percent by weight | |
|---|---|---|
| | Muscovite mica | Phlogopite mica |
| Silica | 45.5 | 40.0 |
| Alumina | 37.5 | 17.0 |
| Potash | 12.0 | 10.0 |
| Magnesia | | 26.5 |
| Ferric oxide | | 3.5 |
| Water | 5.0 | 3.0 |

The composition of any mica will vary from one lot to another, and the values set forth in Table I merely represent average values.

Mica is used extensively by the electrical industry as a dielectric material. For example, electrical insulating tapes have been made by bonding one or more layers of mica splittings to a suitable backing, such as a woven glass fabric, by means of suitable adhesives or bonding agents, such as silicone, polyester, alkyd, vinyl alkyd and epoxy resins, shellac, etc. These tapes are used to provide copper conductors and coils with electrical insulation by winding the tapes about the part to be insulated. The tapes act as turn-to-turn insulation in flat wound coils. Mica splittings have also been used in the formation of molded parts, such as channels. Such molded parts are formed from composite sheets made from natural mica splittings bonded together by a suitable binder.

In the practical application of an electrical insulating tape it is extremely important that the tape be tightly would on the copper conductor or coil to which it is applied. In manufacture of mica tapes, great lengths are gone to, to keep the binder as flexible as possible. However, the limited flexibility and inherent resiliency of natural mica splittings generally prevents the tape from being as flexible as desired, or required, even though the bond is kept very flexible. Because of the limited flexibility of such tapes, undresirable dead air pockets may be formed when the tape is applied; also, it is difficult to maintain the desired dimensions of the insulated part due to the tape tending to "belly out" from the conductor or coil.

Certain serious problems are also encountered in formed built up mica products, such as channels. For example, channels are frequently made with a core comprising superimposed layers of mica splittings with glass fiber cloth on the sides and molded in a cold die after preheating. After the heated material is formed in the cold die, there is a tendency for the channel to lose its form and open up and delaminate. This is due to the inherent resiliency of the natural mica splittings and the limited surface contact between the mica splittings and the bonding agent used.

A prinicpal object of this invention is to provide composite mica products of improved properties comprising superimposed layers of highly flexible, substantially non-resilient dehydrated mica splittings having a laminar structure with capillaries substantially uniformly distributed between adjacent lamnae, and a binder substantially uniformly distributed in the capillaries and on the surface of the splittings and bonding the splittings together.

Another principal object of this invention is the provision of a novel method for making composite mica products of improved properties employing substantially non-resilient, highly flexible, dehydrated mica splittings.

A further object of this invention is to construct or build laminated plate and laminated tape of greater uniformity and greater flexibility from highly flexible, substantially non-resilient, dehydrated mica splittings.

A still further object of this invention is the provision of laminated insulation of dehydrated mica splittings which overcomes the disadvantages of such laminated insulation made from natural mica, heretofore described.

These and other objects of this invention will become more clearly apparent from a consideration of this specification and appended claims.

According to this invention there is provided a novel composite mica product comprising uniformly substantially non-resilient and flexible dehydrated mica splittings and a binder for binding the splittings together.

It was discovered that when mica, for example, muscovite or phlogopite mica, is heated at substantially elevated temperatures for a period of hours, the major portion of the water of crystallization present can be removed, and that for a period of time thereafter an equilibrium is reached where additional water of crystallization is removed relatively slowly, before the mica physically breaks down and disintegrates. It was also found that mica dehydrated to this extent, and prior to physical breakdown of the mica, has a number of extremely valuable physical properties which make it highly desirable for use in making electrical insulating materials. For example, the mica so dehydrated is much more flexible and much less resilient than natural mica. Furthermore, the splittings are substantially uniform throughout their entire extent as regards these valuable properties. Because of the increased flexibility and greatly decreased resiliency of these dehydrated mica splittings, they may be used in the fabrication of extremely flexible tapes, which tapes can be tightly wrapped about conductors and coils with no dead air spaces, and the dimensions of the insulated part can be rigidly maintained. Actual bonding of tape to conductor or coil can be effected with such bond maintained under operating conditions. Also, because of the greatly reduced resiliency of the dehydrated mica, plate made therefrom can be formed into built up mica products, such as channels and coil support rings, and there is no tendency for the formed products to lose form and/or open up or delaminate.

Of particular advantage is the substantially uniform capillary structure between adjacent laminae of the dehydrated mica splittings. When an adhesive or bonding agent in liquid form is applied to the dehydrated mica splittings, it is pulled into the numerous minute capillaries in the splittings by capillary action. Thus, the adhesive or binder is anchored in the splittings rather than merely being in surface contact therewith.

In carrying out this invention, natural mica splittings are used as the raw material. If such splittings are not readily available, block mica can be used, but pretreatment is necessary. Such pretreatment generally involves heating the mica blocks to a temperature high enough to cause maximum expansion without dehydration. If the block mica does not separate into films by the heating operation alone, the expanded hot mica is then allowed to fall into a water bath. The water enters between the mica layers of the block, dividing and subdividing the blocks into thin sheets or splittings. The wet mica may be passed between rolls operating at different speeds to aid in separation of the splittings. Thereafter the splittings are sorted for size and thickness.

The natural mica splittings are then dehydrated by heating the splittings at elevated temperatures for several hours. In the case of muscovite mica a temperature of from about 750° to about 1000° C., and preferably between about 800° and 900° C., is employed. Temperatures above 1100° C., and preferably from about 1200° to about 1400° C. may be used in dehydration of phlogopite mica, although somewhat lower temperatures may be used with poorer grades of phlogopite mica. With muscovite mica the heat treatment should be continued until the mica undergoes a weight loss of at least about 3.75 percent. Preferably the muscovite mica is heated until it loses on the order of about 4.0 to about 4.5 percent, by weight. Phlogopite mica should be so heated at least until a weight loss of about 2.6 percent, and preferably about 3 to about 3.25 percent is registered. With a weight loss of about 3.75 percent for muscovite mica or 2.6 percent for phlogopite mica, the respective micas have given up about 75 percent of water of crystallization. Since the composition of a particular type of mica will frequently vary from one lot to another, and of course with each type of mica, prior to carrying out the dehydration treatment it is generally desirable to determine the composition of the mica, particularly the amount of water of crystallization present. This can be done readily in the laboratory.

Theoretically it is possible to remove all of the water of crystallization by the above heat treatment, but this is generally impractical for complete removal of water is generally followed by a rapid and complete physical breakdown of the mica splittings with the formation of a fragile and brittle material which cannot be used for composite mica products.

There appear to be two transition points which occur during dehydration, (1) when mica changes from a transparent, resilient sheet or film to a translucent, silvery white, metallic colored, soft pliable sheet or film, and (2) when the mica further changes to an opalescent, pearly white colored, stiff sheet or film, which disintegrates readily.

The first transition point is associated with the removal of a major portion of the water of crystallization as evidenced for example by a weight loss in excess of about 3.75 percent for muscovite mica, and about 2.6 percent for phlogopite mica. Removal of this amount of water is ordinarily accompanied by expansion and separation of thicker mica layers into splittings. At this stage of dehydration the mica takes on a substantially uniform silvery white, metallic color and has a marked affinity for absorbing liquids, such as liquid adhesive binders throughout the substantially uniform capillary structure thereby produced and described hereinabove.

The mica splittings used in this invention are dehydrated to the extent described above, but heating is discontinued prior to the second transition, which occurs when the mica change from a silvery white, metallic colored, soft pliable film to a pearly white colored, stiff film which readily disintegrates. By removal of the major portion of the water of crystallization is meant the removal of at least about 75 per cent, and preferably about 85 percent, by weight, or more of the water of crystallization. When this amount of water has been removed, the above-mentioned equilibrium is established where additional water is removed relatively slowly, and the mica takes on a substantially uniform silvery white, metallic luster, and there is a substantially complete absence of transparent areas. Of course, all of the water of crystallization can be removed; however, since the second transition rapidly follows complete dehydration, for practical reasons it is generally preferred not to completely dehydrate the mica.

For most muscovite micas, when about a 4 to about a 4.5 percent weight loss is noted, dehydration has progressed to the preferred extent. For phlogopite mica a weight loss of 3.5 percent is preferred.

As used in this specification and claims, the expression "dehydrated" refers to mica which by heat treatment has lost at least about 75 percent, or more, of water of crystallization and has been converted from a transparent, resilient material to a substantially non-transparent, translucent, silvery white, metallic colored, soft, pliable, substantially non-resilient material having the described substantially uniform capillary structure.

The rate of removal of water will depend on the temperature and the size of the mica splittings. Lower temperatures within the above stated range require longer times than high temperatures. Larger splittings require more time than smaller ones. Preferably, the natural mica splittings which are dehydrated in the manner described above have a thickness in the range between about 0.005 and about 0.001 in., splittings having an average thickness of about 0.008 in. being particularly preferred. The natural mica splittings or flakes which are dehydrated as described above have a minimum area of minimum rectangle, as defined in A.S.T.M. Specification D748–54T issued in 1954, of about 0.5 sq. in. Preferred splittings have a minimum area of minimum rectangle of about 0.75 sq. in., and suitable particles for use in this invention may have an area of minimum rectangle of up to 4.5 sq. in. or more. During dehydration the splittings change little in thickness so that the dehydrated mica splittings will have the approximate thickness of that of the natural splittings from which they are produced.

The term "splittings" as used in this specification and claims means mica particles having a thickness of from about 0.005 to about 0.001 in. and a minimum area of minimum rectangle of about 0.5 sq. in.

Dehydration of mica according to this invention may be carried out batch-wise or continuously. The batch method adapts itself well to dehydration of small quantities of mica. For example, the mica may be placed on trays which are inserted in an electric furnace vented to the atmosphere.

After the mica has been dehydrated, the trays may be removed from the oven to permit the mica to cool. The batch method also adapts itself to dehydration of relatively large quantities of mica. The mica may be placed in a large wire basket which is enclosed in a high temperature gas-fired furnace. Preferably the basket is rotated during hydration to obtain a uniformly dehydrated product. Where large quantities of mica are to be dehydrated, continuous methods are preferably employed. One such continuous method comprises passing natural mica through a gas or an electric furnace on a continuous belt or conveyor.

If the mica is to be stored after dehydration, it is preferably placed in closed containers to minimize water take-up.

As stated previously, built-up mica products advantageously may be made from the dehydrated mica splittings according to this invention. Built-up dehydrated mica products may be mede by superimposing layers of splittings, and applying an organic or inorganic adhesive or binder in liquid form to the dehydrated mica splittings. Organic binders include various synthetic resins such as polyesters, alkyds, vinyl alkyds, phenolics and epoxys. As the liquid binder or adhesive comes in contact with the dehydrated mica it is substantially uniformly dispersed in the capillaries of the splittings by capillary action. If a solvent is used to provide the adhesive or binder with the desired fluidity, it may be removed by passing the splittings through an oven. Where the binder or adhesive is of the organic thermosetting type, the drying oven may be so operated as to advance the thermosetting resin to the partially fusible stage. Where the binder is an inorganic binder such as a silicate, phosphate or borate, the drying oven may be used to volatilize the liquid vehicle for the binder.

In order to aid the binder or adhesive to enter the capillaries of the dehydrated mica splittings, solutions or suspensions of the binder having a relatively low solids content and low viscosity at room temperatures are preferred. Thus, solutions and dispersions of resins, whether thermoplastic or thermosetting, having a resin content in the range between about 10 and 25 percent, by weight, may advantageously be employed. These preferably have a viscosity less than about 50 cps. at 25° C. The solids in dispersions should have a very small particle size, preferably of the order of colloidal size.

The amount of binder employed, based on binder solids, may vary considerably. Generally, from about 4 to about 35 percent, by weight, of binder or adhesive solids, based on dehydrated mica, may be used to provide built up products of very high mechanical strength.

Two broad classes of built up mica plate are well known in the electrical field, namely, rigid plate and flexible plate. By the use of dehydrated mica splittings according to this invention, such built up plate can be provided with greatly improved properties.

There are two types of rigid plate. One is used for flat surface applications where the product must be stable to heat and have a minimum hot and cold compression ratio. Among the more important uses of this type of rigid plate are insulation of copper bars of commutators, support for heating elements, and in the form of discs, washers and bushings for insulating various types of electrical power and electronic equipment.

The second type of rigid plate is commonly known as "molding plate." Molding plate can be used for forming rings, channels, cones, cores, tubes and various other shapes.

In making rigid plate for flat surface applications, a plurality of layers of dehydrated mica splittings impregnated with a suitable organic or inorganic binder are pressed into an integral unit under pressure. Rigid plate ordinarily will comprise about 3 to 12 percent, by weight of binder solids, based on dehydrated mica.

In making "molding plate," superimposed layers of binder-impregnated dehydrated mica are first pressed at relatively low temperature to avoid curing of the binder. The resulting plate then can be cut up into pieces of suitable size and molded into the shape desired under heat and pressure which causes the binder, preferably shellac or a thermosetting resin, to be converted to the infusible state. Molding plate will ordinarily comprise about 8 to about 21 percent, by weight of binder solids, based on dehydrated mica.

Flexible plate may be made with dehydrated mica by essentially the same process as rigid plate except that the binder comprises a resin which will impart flexibility to the build up mica product. The amount of resin generally will be about 12–25 percent. This product can be made as a continuous sheet and can be slit into tape of the desired width. If the tape is relatively thin and comprises but a single layer of splittings, it is essential to have the splittings overlap to obtain a substantially continuous mica layer free of voids between splittings. The built up flexible plate may be combined with a continuous web of a material such as a glass fabric, nylon film, cellophane, paper, non-woven fabrics of asbestos or synthetic fibers, etc., and sold in roll form. The product may also be cut up into sheets and built up into a flexible laminate of the desired thickness. Uses of such flexible plate includes insulation of: armature slots, field coils, and cores of transformers, and magnets.

The invention will be further illustrated by the following specific examples. It should be understood, however, that while these examples describe certain embodiments of the invention, they are given primarily for the purpose of illustration, and that variations may be resorted to within the scope of the appended claims.

*Example I*

No. 4½ Bookpacked muscovite India mica splittings were spread on trays and placed in a laboratory electric furnace in which the mica splittings were heated at 800° C. for a period of 8 hours. At the end of this time the mica splittings were removed from the oven, cooled and weighed. The mica splittings were found to have undergone a weight loss of 4.34 percent. The dehydrated mica splittings had a silvery white, metallic tint, were considerably more pliable than the natural mica raw material and could be bent around themselves without breaking, and were essentially non-resilient.

The capillary properties of the dehydrated mica splittings were determined by placing an edge of specimens thereof in a watch glass containing silicone resin comprising about 20 percent resin solids in equal parts of acetone and toluol, plus 2 percent phthalocyanine blue dye. Definite absorption of resin solution substantially uniformly throughout the entire dehydrated mica splittings was observed.

*Example II*

The procedure of Example I was repeated with the exception that the mica splittings were heated at 800° C. for 23 hours and the weight loss was 4.399 percent. The splittings were translucent to opalescent and had a silvery to yellowish brown, metallic tint (iridescent). The splittings were non-resilient, soft and pliable, and could be handled and flexed without breaking. The splittings had substantially uniformly distributed capillaries between adjacent laminae which permitted the silicone resin to uniformly permeate the entire structure.

*Example III*

The procedure of Example I was repeated with the exception that the mica splittings were heated at 850° C. for 8 hours, and a weight loss of 4.440 percent was noted. The entire sample was translucent to opalescent and had a silvery to yellowish brown, metallic tint (iridescent). The splittings were non-resilient, soft and pliable and could be handled and flexed without breaking. The splitting had substantially uniformly distributed capillaries between adjacent laminae which permitted the resin to uniformly permeate the entire structure.

*Example IV*

Phlogopite mica splittings are spread on trays and placed in a laboratory electric furnace in which the mica splittings are heated at 1100° C. for a period of 10 hours. The mica splittings are removed from the oven, cooled, and weighed, and found to have undergone a weight loss in excess of 3%. The mica splittings are substantially more pliable than the natural mica raw material, substantially non-resilient, and the splittings are filled with capillaries which permit a resin solution to permeate uniformly the entire mica structure.

*Example V*

The following resin composition is permitted to flow in small quantities over superimposed layers of dehydrated, ASTM No. 5½ grade muscovite mica splittings containing less than about 15%, by weight, of water crystallization.

| | |
|---|---|
| Silicone varnish (55–60% solution) _____gal__ | [1] 7.5 |
| Silicone Composition _____ | 2.5 |
| VM & P Naphtha _____ | 2.25 |

[1] 63.0 lbs.

The resin solution is absorbed by the capillaries in the mica splittings and covers the surfaces of the splittings.

A particularly useful product of this invention is an electrically insulating channel of generally rectangular cross section formed of a laminated structure comprising exterior laminae of woven glass fabric between which there is a lamina of dehydrated mica splittings, the entire laminated structure being bonded into an essentially rigid body by means of a suitable binder such as an organic binder.

What is claimed is:

1. A composite mica product comprising substantially uniformly translucent, silvery white, metallic colored, dehydrated mica splittings having a thickness of from about 0.0005 to about 0.001 inch and a laminar structure with capillaries substantially uniformly distributed between adjacent laminae within said splittings and a binder binding said splittings together, said binder being distributed through the capillaries of said splittings.

2. A composite mica product according to claim 1 in which said dehydrated mica comprises dehydrated muscovite mica.

3. A composite mica product according to claim 1 in which said dehydrated mica comprises dehydrated phlogopite mica.

4. A composite mica product according to claim 1 in which said binder comprises shellac.

5. A composite mica product according to claim 1 comprising from about 4 to about 35 percent, by weight, of binder solids, based on dehydrated mica splittings.

6. A composite mica product according to claim 1 in which said binder comprises an inorganic binder.

7. A composite mica product according to claim 1 in which said binder comprises an organic binder.

References Cited by the Examiner

UNITED STATES PATENTS

| | | | |
|---|---|---|---|
| 1,953,950 | 4/1934 | Boughton _____ | 161—171 |
| 2,195,254 | 3/1940 | Miller _____ | 161—171 |
| 2,363,323 | 11/1944 | Hill _____ | 156—62.8 |
| 2,575,733 | 11/1951 | Schulman et al. _____ | 154—2.6 |
| 2,760,879 | 8/1956 | McDaniel et al. _____ | 154—2.6 |
| 2,810,425 | 10/1957 | Heyman _____ | 154—2.6 |
| 2,865,426 | 12/1958 | Heyman _____ | 161—171 |
| 3,069,302 | 12/1962 | Lewis et al. _____ | 161—163 |

ALEXANDER WYMAN, *Primary Examiner.*

EARL M. BERGERT, *Examiner.*

UNITED STATES PATENT OFFICE
CERTIFICATE OF CORRECTION

Patent No. 3,226,286                      December 28, 1965

Edward W. Scheuer

It is hereby certified that error appears in the above numbered patent requiring correction and that the said Letters Patent should read as corrected below.

Column 1, line 16, for "contemuplates" read -- contemplate --; line 17, for "meica" read -- mica --; column 2, line 6, for "undresirable" read -- undesirable --; column 3, line 72, for "2,6 percent" read -- 2.6 percent --; column 4, line 9, for "change" read -- changes --; lines 43 and 58, for "0.005", each occurrence, read -- 0.0005 --; line 44, for "0.008" read -- 0.0008 --; column 5, line 9, for "mede" read -- made --; column 6, line 4, for "build" read -- built --; same column 6, lines 4 and 5, for "gentrally" read -- generally --.

Signed and sealed this 10th day of January 1967.

(SEAL)

Attest:

ERNEST W. SWIDER
Attesting Officer

EDWARD J. BRENNER
Commissioner of Patents